United States Patent [19]

Szostak et al.

[11] Patent Number: 4,688,707
[45] Date of Patent: Aug. 25, 1987

[54] METHOD AND APPARATUS FOR CLEAVING OPTICAL FIBER

[75] Inventors: Tadeusz Szostak, Gillette; Anthony F. Kuklo, Jr., Bridgewater, both of N.J.

[73] Assignee: Thomas & Betts Corporation, Raritan, N.J.

[21] Appl. No.: 777,107

[22] Filed: Sep. 17, 1985

[51] Int. Cl.$^4$ ............................................. C03B 37/16
[52] U.S. Cl. .................................... 225/2; 225/96.5; 225/106
[58] Field of Search ............... 225/2, 96, 96.5, 101, 225/106

[56] References Cited

U.S. PATENT DOCUMENTS

| | | | |
|---|---|---|---|
| 4,202,475 | 12/1980 | Hirai et al. | 225/2 |
| 4,229,876 | 10/1980 | Doty | 29/469 |
| 4,315,584 | 2/1982 | Wuestner | 225/2 |
| 4,322,025 | 3/1982 | Johnson | 225/96.5 |
| 4,413,763 | 11/1983 | Lukas | 225/2 |
| 4,456,159 | 6/1984 | Roberts et al. | 225/96.5 |
| 4,503,744 | 3/1985 | Garner et al. | 83/879 |
| 4,552,290 | 11/1985 | Szostak | 225/2 |

Primary Examiner—Frank T. Yost
Attorney, Agent, or Firm—Robert M. Rodrick; Salvatore J. Abbruzzese

[57] ABSTRACT

An optical fiber cleaving tool is disclosed wherein a housing insertably receives an optical fiber extending from a fiber optic ferrule. A cleaving module is contained in a housing for scoring the fiber. A fiber pulling element grasps the fiber at a location spaced from the second location, and simultaneously axially offsets the fiber and pulls the second location away from the first location to effect severing of the fiber at the scored location.

11 Claims, 13 Drawing Figures

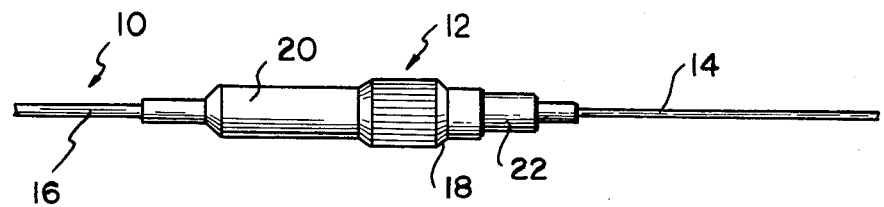
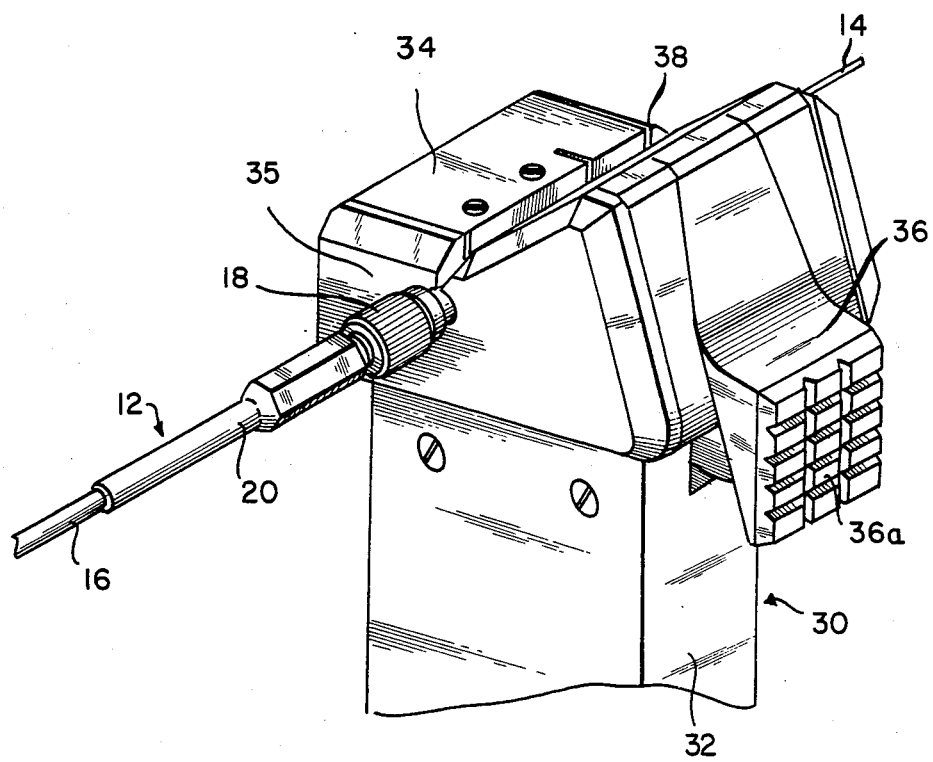

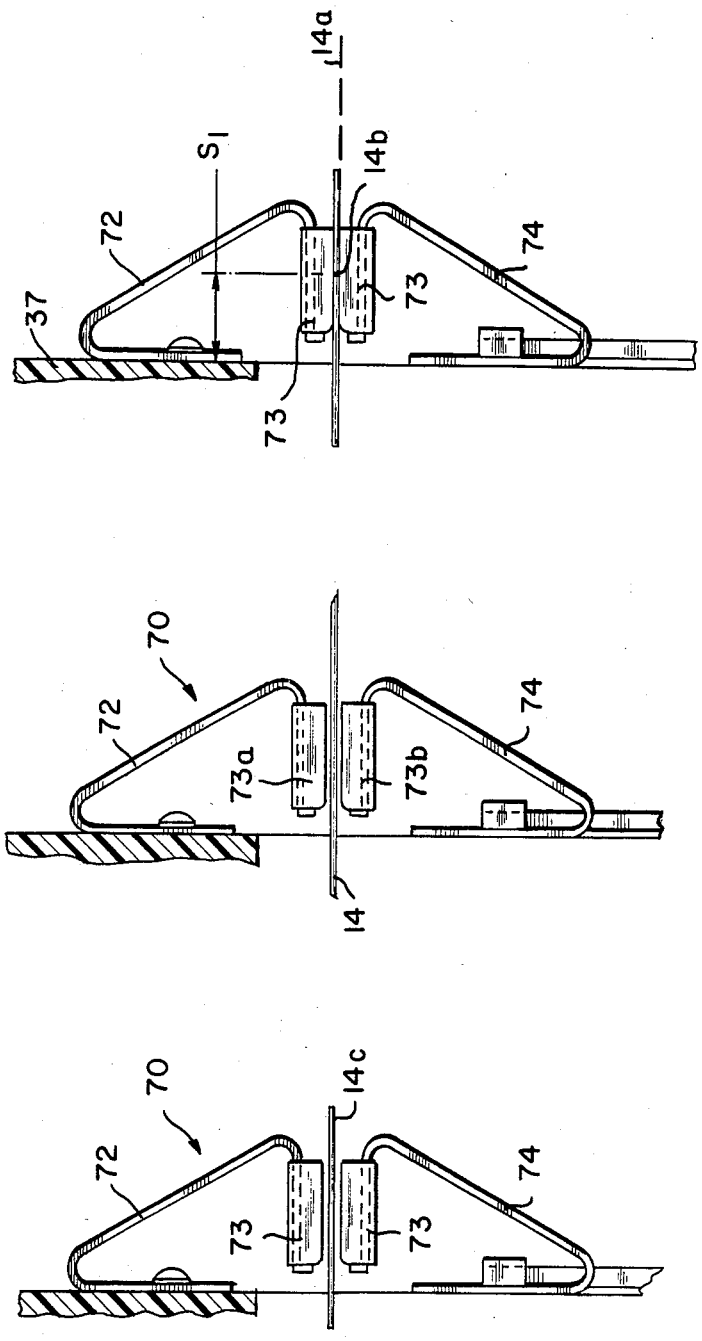

METHOD AND APPARATUS FOR CLEAVING OPTICAL FIBER

FIELD OF INVENTION

This invention relates generally to a method and apparatus for cleaving an optical fiber and more particularly relates to a method and apparatus for breaking a scored optical fiber at the scored location.

BACKGROUND OF THE INVENTION

Throughout the development of fiber optic data transmission, it has been known that in order to maximize transmission capabilities of the fiber optic system at locations such as taps and splices, it is essential that joined fibers be properly aligned to reduce transmission loss therebetween. It is also known that proper preparation of the end face of the fiber which is to be connected will reduce transmission loss through that fiber end face. It is highly desirable to prepare a optical fiber end face to have a smooth mirror-type finish thereby providing a greater optical transmission area across the end face. In additiion, it is also desirable to provide a fiber end face which is nearly perpendicular to the longitudinal axis of the fiber.

There are many known fiber optic cleaving tools which attempt to provide this nearly perfect flat perpendicular end face. Most of these tools employ a scoring blade which is brought down into contact with the fiber to score or nick the fiber surface. This causes a weak point in the fiber at which the fiber can be separated by applying proper axial tension to the fiber on each side of the scored location. Placing axial tension on one side of the scored location assure a better cleaved surface.

Fiber optic termination tools of this type may take many forms. As disclosed in U.S. Pat. No. 4,229,876, issued Oct. 28, 1980, an optical fiber breaker is disclosed where the fiber is placed in axial tension prior to scoring or nicking the fiber surface. This technique claims to provide a superior fiber end face. However, U.S. Pat. Nos. 4,202,475, issued May 13, 1980 and 4,322,025, issued Mar. 30, 1982, disclose optical fiber cutting tools which score a non-tensioned optical fiber and then provide axial tension on each side of the scored location to effect a cleave. These patents also suggest that this sequence provides a superior optical end face. It is also known to effect severing of the scored fiber by applying axial tension in the form of longitudinal pulling of the fiber on each side of the scored location. A device of this type may be seen in U.S. Pat. No. 4,372,048, issued Feb. 8, 1983, and assigned to the assignee of the present invention.

More recently, development of optical fiber cleaving tools has reached a point where a device is available which both longitudinally pulls and bends the fiber about a scored location to effect the severing thereof. U.S. Pat. No. 4,552,290 assigned to the assignee of the present invention, discloses a tool wherein, in sequence, the fiber is first scored, then axially offset to effect bending, then longitudinally pulled to effect severing. While a tool of this construction provides a fiber termination end having an end face of desired qualities, the sequential steps of the tools's operation may prove to be slightly cumbersome in field applications. Thus, it is desirable to provide a tool which will provide a suitable termination end face by properly applying techniques of scoring and axially tensioning the fiber, yet will be simple to use and operate in field applications.

A further dichotomy is found in existing optical fiber cleaving tools in that many tools cleave a bare fiber extending from an optical cable and others are constructed to cleave a fiber terminated in an optical connector or ferrule. The later type tool is obviously more advantageous for field applications. Examples of the non-connectorized fiber tools are shown in the above-identified '475 and '025 patents, while the above-identified '876 patent is representative of connectorized fiber cleaving tools. While it is desirable to provide a tool which accommodates connectorized fibers, problems associated with connectorization must be overcome.

A major problem found in tools of this nature, is the ability to cleave the fiber within close proximity to the egressing end of the fiber ferrule. It is even more important to provide a cleaved fiber end face which is at a prescribed constant distance from the end of the egressing end of the ferrule. Variations in the length of the fiber with respect to ferrule end, may be caused by improper insertion of the connector into the cleaving tool or deformation of the ferrule, itself, due to over insertion of the connector into the cleaving tool. It is desirable to provide a fiber optic cleaving tool which will accommodate a fiber in a fiber optic connector and which will align the connector in the tool to provide a constant predetermined fiber termination length over repeated uses.

SUMMARY OF THE INVENTION

It is an object of the present invention to provide an optical fiber cleaving device for cleaving an optical fiber along the length thereof.

It is a more particular object of the present invention to provide a method an apparatus for breaking an optical fiber at a scored location to provide a suitable termination end face.

In the efficient of the foregoing and other objects a method and apparatus is provided herein, wherein an optical fiber is supported in an optical fiber cleaving tool. An actuatable cleaving means is movably supported in the housing adjacent the fiber to score the fiber at a location therealong. The fiber breaking means engages the fiber distally of the scored location to place axial tension at the scored location to break the fiber thereat.

In a more particular embodiment described herein, the housing accommodates an optical fiber in an optical fiber ferrule with a portion of the fiber extending therethrough. Actuatable cleaving means is supported on the housing adjacent the fiber ferrule for scoring the fiber. Actuatable fiber breaking means grasps the fiber and axially bends and pulls the fiber to effect a break at the scored location. Actuation means is provided for actuating both the cleaving means and the fiber breaking means.

BRIEF DESCRIPTION OF THE DRAWINGS

FIG. 1 shows an optical cable terminated in an optical fiber connector assembly.

FIG. 3 is a partial showing of the cleaving tool of FIG. 2 with the connectorized fiber inserted therein.

FIGS. 6a through 6d, show in schematic fashion, the further operation of the cleaving tool of the present invention which effects severing of the optical fiber.

DETAILED DESCRIPTION OF THE PREFERRED EMBODIMENT

Figure 2:
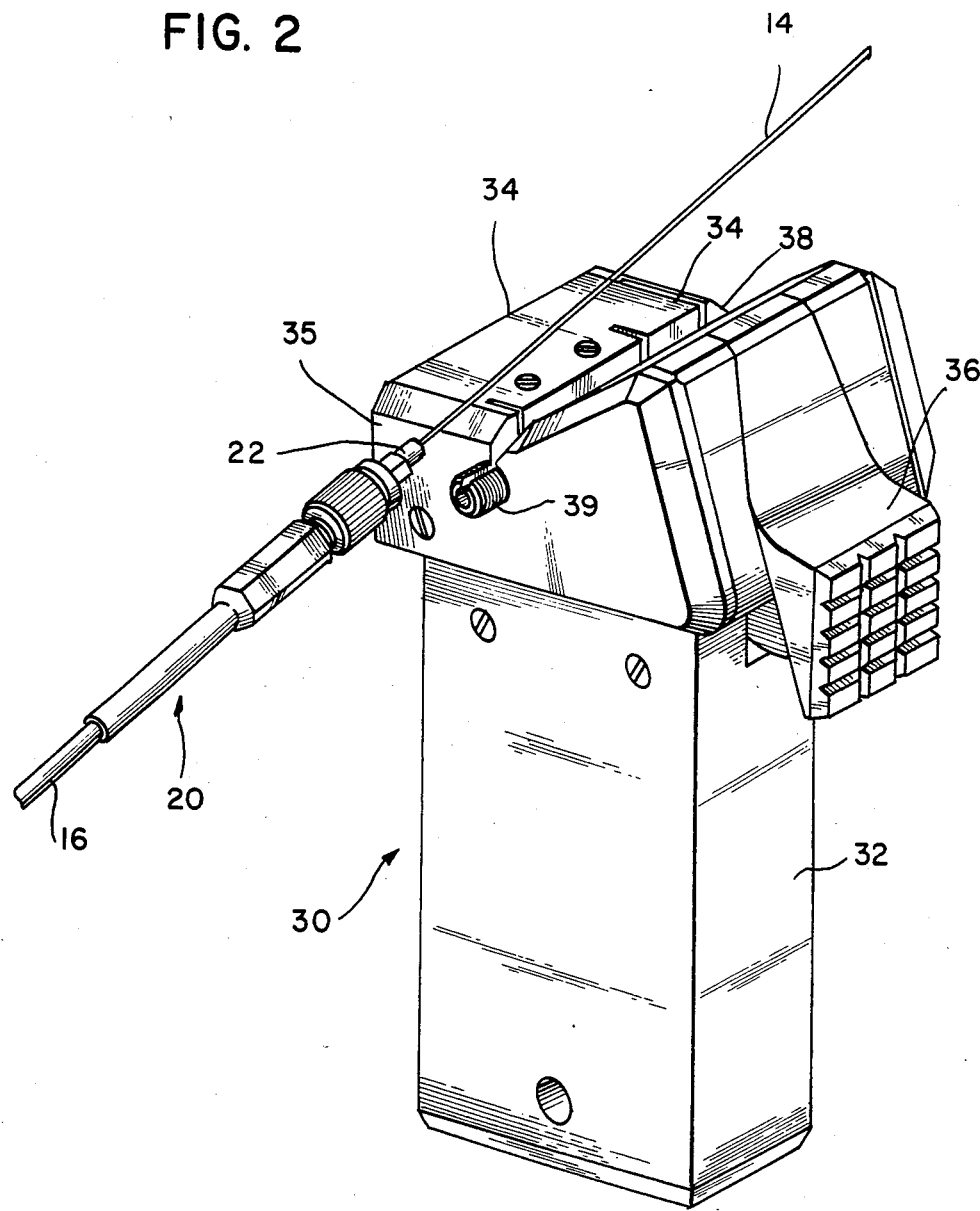
FIG. 2 shows, in perspective view, the optical fiber cleaving tool of the present invention.

Referring to FIG. 1, there is shown a fiber optic cable 10 terminated in a connector assembly 12. Cable 10 is conventional fiber optic cable including an optically transmissive fiber 14 extending from a plastic jacket 16. The cable 10 is prepared in a suitable manner by cutting back the plastic jacket 16 to expose an extended length of fiber 14. The connector assembly 12 includes a main connector body 18, a rear cable accommodating sleeve 20 and an extending fiber egressing ferrule 22. Connector body 18 may include at the end thereof, adjacent ferrule 22, screw threads for screw accommodation with another optical device such as a mating optical connector. Ferrule 22, shown in FIG. 1, may be of the type shown and describd in U.S. patent application Ser. No. 527,438, filed Aug. 29, 1983, now abandoned.

Referring to FIGS. 2 and 3, optical fiber cleaving tool 30 is shown. Cleaving tool 30 has an elongate substantially rectangular handle 32 and an upper operable housing 34. The tool 30 also includes an actuatable lever 36 supported on housing 34 for manual operation of the cleaving tool by an installer as will be described in further detail hereinbelow.

Housing 34 includes a transverse, upwardly opening slot 38 which provides for vertically insertable accommodation of optical fiber 14 supported in connector 20. Adjacent one end of slot 38, housing 34 includes an externally threaded, extending sleeve 39 which provides for a screw reception of connector 20. As will be described in further detail hereinbelow, progressive screw attachment of connector 20 to sleeve 39 provides for a progressive axial movement of the connector 20 and cable 10 along the longitudinal extent of slot 38. A mounting surface 35 supports threaded sleeve 39. In preferred form, housing 34 includes a plastic, removable cover 34a which provides access to the internal mechanism of the cleaving tool 30 housed in housing 34. Handle 32, which is also removably supported to housing 34, is formed in the preferred embodiment of a suitably rigid metal.

Figure 4:
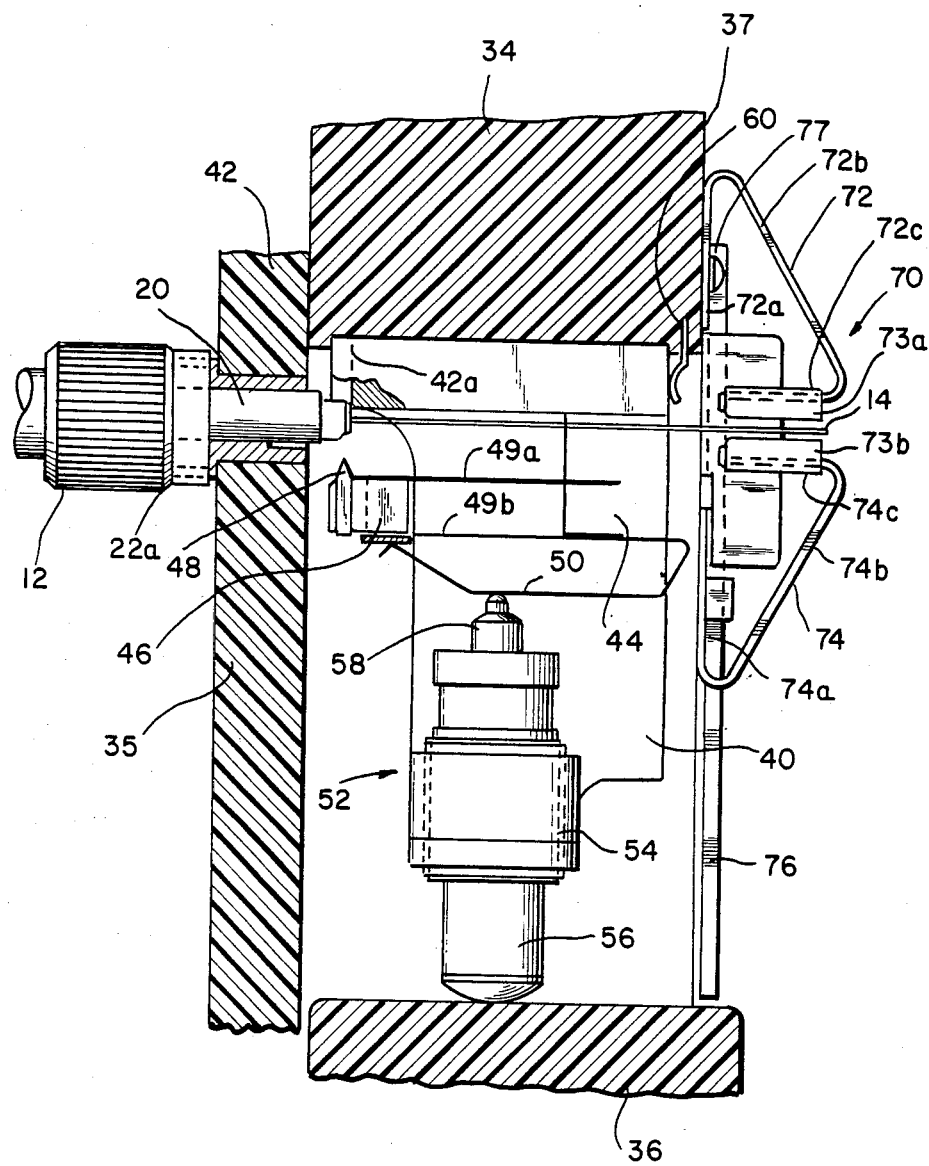
FIG. 4 is a top view of the optical fiber cleaving tool of FIGS. 2 and 3 with the cover removed to show the internal workings of the cleaving mechanism.

Referring to FIG. 4, the mechanism of the optical cleaving tool 30 may be described. Housing 34, of tool 30, supports therein a fiber cleaving module 40. Cleaving module 40 includes a support member 42 which forms the base of cleaving module 40. A perpendicularly extending arm 44 extends from support member 42 and supports a cleaving element assembly 46. Cleaving element assembly 46 includes a cleaving element 48 for moveable disposition over fiber 14. Cleaving element 48 is supported on arm 44 by a pair of parallel cantilevered spring beams 49a and 49b which provide for moveable engagement of cleaving element 48 with fiber 14. A flex bar 50 is supported over cantilevered 49a and 49b to provide for spring movement of the parallel cantilevered beams 49a and 49b. The operation of the cleaving element assembly 46, shown in FIG. 4, is substantially similar to that shown and described in U.S. Pat. No. 4,503,744, issued Mar. 12, 1985, entitled "Cleaving Device For Optical Fibers" and assigned to the assignee of the present invention.

However, it is noted that in the '744 patent, the cleaving element extends from its support in a direction transverse to the extending elongate fiber. In the present invention the cleaving element is supported in a direction substantially parellel to the elongate fiber (i.e. cantilevered beams 49a and 49b extend parallel to fiber 14). This positioning provides for a more accurate and precise cleaving location along the fiber as the cleaving element 48 is fixedly positioned with respect to fiber 14. No movement of the cleaving element 48 is possible in a direction parallel to fiber 14. Thus, any inadvertent movement of the cleaving element 48 due to shock or other vibration causing a movement of beams 49a and 49 will not change the longitudinal position of the cleaving element 48 with respect to fiber 14.

Disposed in contact with flex bar 50, cleaving module 40 supports an operable, retractable, plunger-type mechanism 52 which provides cleaving movement to cleaving element assembly 46. Plunger mechanism 52 includes a mechanism housing 54 which provides for such retractable of a pair of axially aligned rods 56 and 58. A first moveable rod 56 is supported at one end of mechanism housing 54 and is progressively insertable into mechanism hosuing 54 upon movement of lever 36 as will be described in detail hereinbelow. Progressive movement of first rod 56 into mechanism housing 54 causes corresponding outward movement of second rod 58 which moves into contact with flex bar 50 of cleaving element assembly 46, initiating the cleaving action by deflecting flex bar 50 and thereby cantilevered beams 49a and 49b. Further progressive movement of first rod 56 causes further movement of second rod 58 to indirectly cause cleaving element 48 to score or nick fiber 14. Plunger mechanism 52 includes a retractable feature which upon still further insertion of first rod 56 will cause second rod 58 to immediatley retract. Thus, continuing linear movement of first rod 56 will not be directly imparted to second rod 58. Accordingly, retraction of second rod 58 will release the deflected flex bar 50 and cantilevered beams 49a and 49b and cleaving element assembly 46 will retract from its scoring position as will be described in detail hereinbelow.

The position of plunger mechanism 52 is vertically adjustable within housing 34. This adjustment allows for adjustment in the amount of force at which fiber 14 is cleaved. As an example the closer plunger mechanism 52 is to support 42, the more deflection of cantilevered beams 48a and 49b will take place. Thus, more force will be placed on fiber 14 by cleaving element 48.

Cleaving module 40 is supported in housing 34 against the bias of spring 60. Spring 60 provides for spring bias movement of cleaving module 40 in a direction parallel to the longitudinal axis of fiber 14. Upon longitudinal movement of connector 20 occasioned by screw attachment of connector 20 to sleeve 39 (FIGS. 2 and 3) the end face 22a of ferrule 20 will engage an integral formed stop surface 42a of support surface 42. Continued screw insertion of connector 20 into housing 34 will cause movement of cleaving module 40 against the bias of spring 60. Since cleaving element 48 is fixedly positioned with respect to support member 42 cleaving element 48 will always cleave fiber 14 at a location which is a fixed distance with respect to stop surface 42a and thus at a fixed position with respect to ferrule end face 22a. As long as connector 12 is inserted to the position where ferrule end face 22a abutts stop surface 42a, fiber 14 will always be scored at a location predetermined and fixed with respect to the end face 20a of ferrule 20. Adverse effects of over insertion are prevented by the spring bias movement of cleaving module 14. As may be the case with a fixed cleaving module, damage to the ferrule due to over insertion of the connector is avoided. A pair of mating stop members in the form of the outside wall of mounting plate 35 and the front face of connector body 18 limit axial movement of connector 20.

Housing 34 further supports at a location spaced from cleaving module 40, fiber breaking means 70. Fiber breaking means includes a pair of fiber pulling elements 72 and 74. Each fiber pulling element is formed of an elongate spring element which is bent in the configuration shown in FIG. 4. Fiber pulling elements 72 and 74 are preferably made of a spring steel material. First fiber pulling element 72 is a stationary member fixedly positioned at one end to housing 34. Stationary fiber pulling element 72 includes a fixed base 72a, a cantilevered extending portion 72b and a depending fiber support 72c. Second fiber pulling element 74 is configured identical to stationary fiber pulling element 72 and is positioned in facing relation thereto. Each extending fiber support portions, 72c of pulling element 72 and 74c of pulling pulling element 74, includes a fiber engagement pad 73a and 73b respectively for engagement with fiber 14. Engagement pads 73a and 73b are formed of a suitably resilient material for clamping and securing a portion of fiber 14 spaced from ferrule 20. Moveable fiber pulling element 74 is supported along support portion 74a by a support bar 76. Support bar 76 is in turn engagable with lever 36 to move in a vertical direction, as shown in FIG. 4, toward stationary pulling element 72. A guide element 77 accommodates support bar 76 for sliding receipt therein. Guide element 77 prevents any rocking Motion of movable pulling element 74. As will be described in further detail hereinbelow, upon actuation of lever 36 moveable fiber pulling element 74 will move toward and engage stationary fiber pulling element 72 to clamp a portion of fiber 14 therebetween to effect breaking of the fiber at the scored located adjacent ferrule 20.

Figure 7:
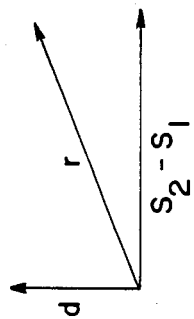
FIG. 7 is a diagrammatic representation of the vector forces applicable, in principle, to the tool of the present invention.

Having described the elements of tool 30 of the present invention, its operation may be described by referring to the schematic drawings of FIGS. 5, 6 and 7.

Figure 5A:
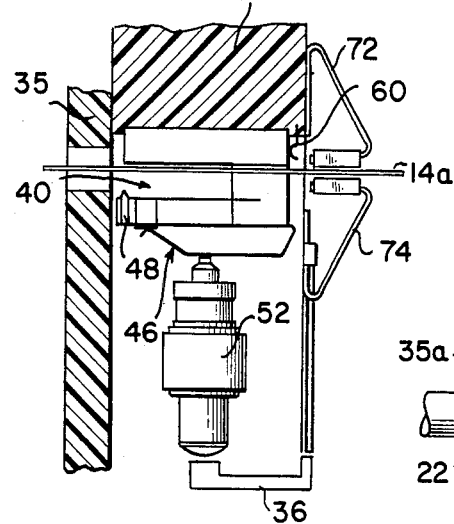
FIGS. 5a through 5d, shown in schematic fashion, the operation of the cleaving tool of the present invention.

Referring to FIG. 5a, housing 34 is shown supporting cleaving module 40 in contact with spring 60. Housing 34 also supports stationary pulling element 72. Lever 36 which is movably supported to housing 34 supports moveable pulling element 74 and is positioned for engagement with plunger mechanism 52 for operating cleaving element assembly 46 as described hereinabove. Longitudinal axis 14a is representative of the axis along which fiber 14 will lie in tool 30.

A. OPERATION OF THE SPRING LOADED CLEAVING MODULE 40

As seen in FIG. 5a, cleaving module 40 is shown positioned adjacent mounting plate 35 of housing 34. Spring 60 urges cleaving module 40 into this position.

Figure 5B:
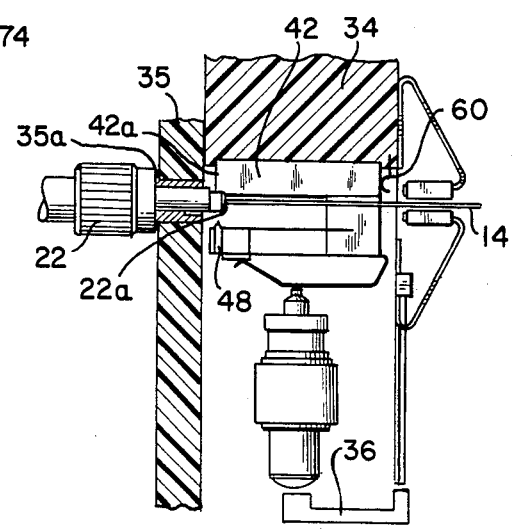

Moving to FIG. 5b, ferrule 22 with fiber 14 extending therefrom is inserted into housing 34 through an opening 35a in mounting plate 35. Upon insertion, front face 22a of ferrule 22 engages stop surface 42a of support member 42. Further insertion of ferrule 22 occasioned by the screw attachment of connector 12 to mounting plate, as above described, will move the cleaving module 40 against the bias of spring 60 away from plate 35. As cleaving element 48 is fixed with respect to support member 42 the cleaving element 48 will be positioned above fiber 14 at a location fixed with respect to front face 22a of ferrule 22. Regardless of the amount of insertion of ferrule 22 into housing 34 this relative position of cleaving element 48 with respect to front face 22a of ferrule 22 will be maintained. It is noted here that the precise location at which cleaving element 48 strikes fiber 14 is predetermined by the construction of and positioning of element 48 with respect to support member 42. It is also noted that with precise construction, fiber 14 may be cleaved spaced from, directly at or slightly inwardly of front face 22a of ferrule 22. However, as shown in the embodiment illustrated herein, fiber 14 is cleaved just inwardly of front face 22a of ferrule 22. The technique for cleaving the fiber inwardly of front face 22a is shown and described in the above mentioned U.S. patent application Ser. No. 462,571. Movably positioning cleaving module 40 in housing 34 assures the precise repeatable cleaving location of fiber 14. Also, movement of cleaving module 40 prevents damage to ferrule 22 upon insertion into housing 34 and against stop surface 42a of support member 42.

B. SCORING OF OPTICAL FIBER 14

Referring again to FIG. 5b, fiber 14 is shown in position to be cleaved by cleaving element 48. Lever 36 is actuated by manual installer operation (FIG. 3) by grasping the handle and pushing down on flat area 36a of lever 36.

Figure 5C:
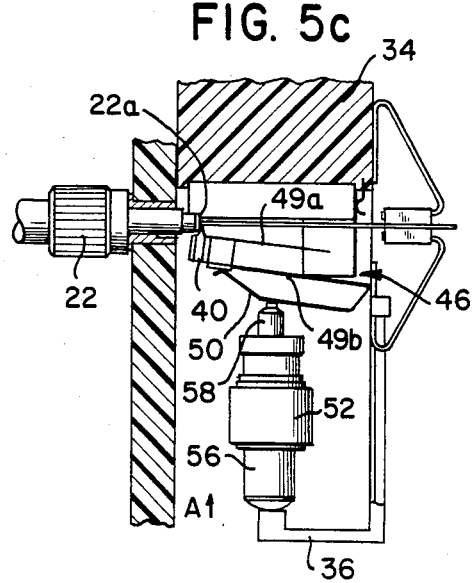
Figure 5D:
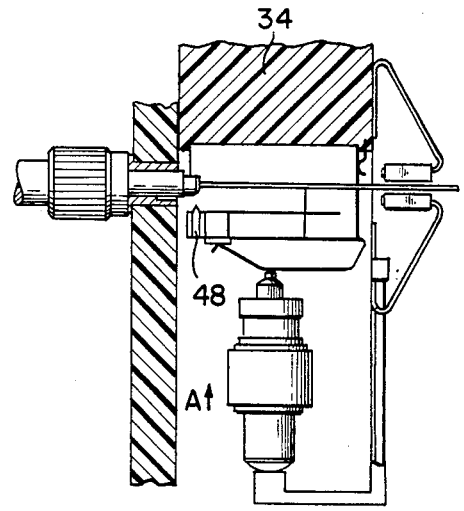

Referring to FIG. 5c, as lever 36 is depressed in the direction of arrow A, first rod 56 will be inserted into mechanism 52 causing corresponding movement of second rod 58 in the direction of arrow A. Movement of second rod 58 in turn causes deflection of flex bar 50 and further, deflection of parallel cantilevered beams 49a and 49b. This in turn causes engagement of cleaving element 48 with fiber 14 to score or nick the fiber at a location adjacent front face 22a of ferrule 22. Continued depression of lever 36 will cause continued inward movement of first rod 56 at which point second rod 58 will retract so that cleaving element 48 will return to its original position shown in FIG. 5d, after scoring fiber 14. As above mentioned, the scoring of fiber 14 by scoring element 48 is performed in a manner similar to that shown and described in the above mentioned '744 patent.

As plunger type mechanism 52 causes retraction of second rod 58 after cleaving of fiber 14, continuous depression of lever 36 will cause no further movement of cleaving element assembly 46. Thus, while operable in one continuous motion of lever 36, the scoring of fiber 14 and the actuation of pulling means 70 is accomplished in successive non-interdependent steps. Accordingly, the operation of pulling means 70 may be described with references to FIGS. 6a through 7c.

C. BREAKING OF SCORED FIBER 14

Referring to FIG. 6a, a distal end portion 14c of fiber 14 is shown extending between fiber pulling element 72 and 74 of fiber breaking means 70. The position illustrated in FIG. 6a is similar to that shown in FIG. 5a prior to scoring of fiber 14. In this position the distal portion 14c of fiber 14 is positioned closely adjacent to engagement pad 73 of stationary puller 72. It is contemplated that with certain variations in fiber diameter and tool compensation, the distal portion 14c of fiber 14 may be either spaced closely to engagement pad 73 of stationary puller 72 or may lie against and in engagement with engagement pad 73.

Referring to FIG. 6b, fiber breaking means 70 is shown as it is positioned during fiber scoring (FIG. 5c). Moveable fiber pulling element 74 is moved during fiber scoring, toward stationary element 72 and into close proximaty with fiber 14 under the influence of the movement of lever 36 (not shown). As the fiber is scored, engagement pad 73b of moveable puller 74 does not engage fiber 14, thus in preferred embodiment, the distal extent 14c of fiber 14 is unsupported at the time of scoring of the fiber 14. As plunger mechanism 52 provides for the retraction of second rod 58 (FIGS. 5c and 5d) further depression of lever 36 will cause movement of only moveable puller 74.

Referring to FIG. 6c, upon further depression of lever 36 moveable puller 74 moves into engagement with fiber 14. Engagement pad 73b of moveable puller 74 contacts fiber 14. Fiber 14 is then urged against engagement pad 73a of stationary puller 72. Thus, the distal extent 14c of fiber 14 is moved substantially parallel to and out of the plane of the original fiber axis 14a. This movement creates a slight tension about the scored location, but this movement causes insufficient tension to break the fiber at the scored location. As shown in FIG. 6c, engagement pads 73a and 73b are clamped against fiber 14 to secure therebetween a central fiber location 14b. Prior to further movement of lever 36 fiber location 14b will lie a distance $S_1$ from housing wall 37 and also lie substantially along axis 14a.

Figure 6D:
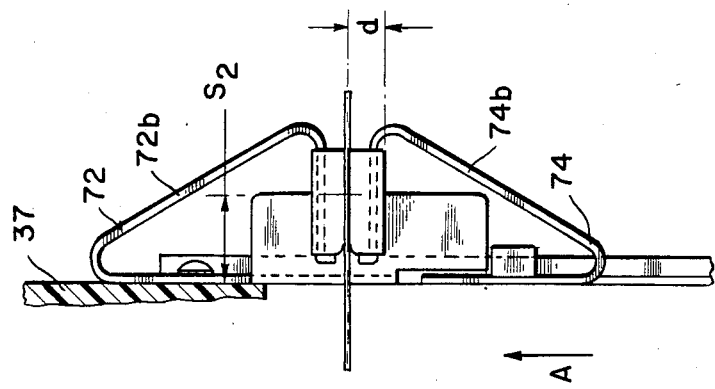

Referring to FIG. 6d, the effects of further movement of moveable fiber pulling element 74 is shown. As fiber pulling element 74 is moved further in the direction of arrow A, compound movement of both stationary fiber pulling element 72 and moveable fiber pulling element 74 are achieved.

Referring to stationary fiber pulling element 72, movement of moveable fiber pulling element 74 causes deflection of cantilevered extent 72b in a direction having components both in the vertical and horizontal direction as shown in FIG. 6d. Similarly, the deflection of the cantilevered extent 74b of moveable pulling element 74 also has identical movement in both the vertical and horizontal direction. Thus, engagement pads 73a and 73b will move upwardly as shown in FIG. 6d under the influence of the movement of moveable pulling element 74 and will also move outwardly away from housing wall 37 due to the spring movement of cantilevered spring extent 72b and 74b. Thus, engagement pads 73a and 73b and accordingly, location 14b of fiber 14 secured therebetween, will move in both a horizontal and vertical direction. The amount of fiber movement in the vertical direction (off of axis 14c) will be a distacne "d". Movement of fiber location 14b in the horizontal direction will be from its original distance $S_1$ from wall 37 to a distance $S_2$ from wall 37.

It can be seen that fiber location 14b will be displaced vertically a distance "d" from its original location and be displaced horizontally a distance $S_2$ minus $S_1$. Thus, the overall movement exhibited by the clamping pads and the fiber location 14b secured therebetween will be in the direction somewhere between the vertical and horizontal. The vector representation of such movement is shown in FIG. 7 where actual movement of location 14d is the resultant "r" of horizontal vector $S_2$ minus $S_1$ and vertical vector "d". This compound movement caused by movement of both stationary fiber pulling element 72 and moveable fiber pulling element 74 causes a simultaneous bending of the fiber about the scored location and axially pulling of the fiber away from the scored location. When the tension created by such movement exceeds the resistance of the fiber, the fiber will break at the scored location leaving a nearly perpendicular end face. Once past this point of breaking the lever 36 can be released and the cut end of the fiber will fall from tool 30. In order to prevent partial depression of trigger 36, thereby causing insufficient bending and pulling to severe the fiber, tool 30 is equipped with a commercially available full stroke compelling mechanism which prevents release of the trigger prior to full cycling of the tool. A mechanism of such description is manufactured and sold for various tools, by the assignee of the present invention, under the registered trademark SHURE-STAKE.

Various changes to the foregoing described and shown structures would now be evident to those skilled in the art. Accordingly, the particularly disclosed scope of the invention is set forth in the following claims.

We claim:

1. An apparatus for cleaving an elongate optical fiber retained in and extending from a ferrule, said apparatus comprising:
   a housing for fixedly supporting said ferrule;
   actuatable cleaving means movably supported on said housing adjacent said ferrule for scoring said fiber at a location on said fiber;
   actuatable fiber breaking means including a first spring biased pulling element fixedly supported in said housing for supporting said fiber at a second fiber location distally spaced from said first location and a second spring biased pulling element movably supported in said housing for movement into engagement with said first pulling element for grasping said fiber at said second location and for moving said fiber simultaneously in directions both transversely of said linear fiber axis and axially away from said scoring location whereby said fiber is severed at said scoring location.

2. An apparatus in accordance with claim 1 further including actuation means for actuating said fiber cleaving means to score said fiber and for subsequently actuating said fiber breaking means to break said fiber at said scoring location.

3. An apparatus in accordance with claim 2 wherein said actuatable cleaving means includes an elongate support member engagable with said ferrule for abutting alignment therewith, and a fiber cleaving element movably supported over said support member being movable toward said support member upon actuation of said cleaving means to score said fiber.

4. An apparatus in accordance with claim 3 wherein said housing includes a ferrule holding member thereon for supporting said ferrule in abutting relationship with said support member.

5. An apparatus in accordance with claim 4 wherein said fiber breaking means includes a pulling element for grasping said fiber at said second location.

6. An apparatus in accordance with claim 5 wherein said actuation means includes a manually operable, progressively movable lever in operable engagement with said fiber cleaving element and said fiber pulling element for urging said cleaving element into contact with said fiber and subsequently activating said pulling element to pull said fiber at said second location.

7. An apparatus in accordance with claim 2 wherein said actuation means includes single operable means for actuating both said cleaving means and said breaking means.

8. An apparatus in accordance with claim 1 wherein each of said spring pulling elements are independently deflectably movable, movement of said pulling elements having a component in a first direction perpendicular to said fiber axis and a component in a second direction parallel to said fiber axis.

9. An apparatus in accordance with claim 8 wherein said fiber pads are jointly movable, upon engagement of said first puller with said second puller, in a direction oblique to said first and second directions.

10. A method of cleaving an elongate optical fiber supported in an optical fiber ferrule comprising the steps of:
holding said fiber along a pre-determined axis;
scoring said fiber at a first location;
clamping said fiber at a second location spaced from said first location between a pair of spring biased pulling elements; and
moving said pair of pulling elements against the spring bias to simultaneously axially offset said second location and pull said second location longitudinally away from said scored fiber location.

11. A method in accordance with claim 10 wherein said scoring step includes moving a scoring element into contact with said fiber at said first location.

* * * * *